United States Patent
Shanmuga Vadivel et al.

(10) Patent No.: US 10,528,791 B1
(45) Date of Patent: Jan. 7, 2020

(54) BIOMETRIC TEMPLATE UPDATING SYSTEMS AND METHODS

(71) Applicant: Synaptics Incorporated, San Jose, CA (US)

(72) Inventors: Karthikeyan Shanmuga Vadivel, San Jose, CA (US); Boyan Ivanov Bonev, San Jose, CA (US); Krishna Mohan Chinni, Canton, MI (US); Omar Oreifej, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 407 days.

(21) Appl. No.: 15/448,470

(22) Filed: Mar. 2, 2017

(51) Int. Cl.
*G06K 9/00* (2006.01)

(52) U.S. Cl.
CPC ......... *G06K 9/001* (2013.01); *G06K 9/00026* (2013.01); *G06T 2200/32* (2013.01); *G06T 2207/20212* (2013.01); *G06T 2207/20221* (2013.01)

(58) Field of Classification Search
CPC .......... G06K 9/00026; G06K 9/00067; G06K 9/00073; G06K 9/0008; G06K 9/00087; G06K 9/00093; G06K 9/001; G06T 2200/32; G06T 2207/20212; G06T 2207/20221
See application file for complete search history.

(56) References Cited

U.S. PATENT DOCUMENTS

| | | | |
|---|---|---|---|
| 7,542,590 B1 * | 6/2009 | Robinson ........... | G06K 9/00006 382/115 |
| 7,616,787 B2 | 11/2009 | Boshra | |
| 7,634,117 B2 | 12/2009 | Cho | |
| 7,760,921 B2 | 7/2010 | Sawano | |
| 8,344,849 B2 | 1/2013 | Larsson et al. | |
| 8,824,749 B2 | 9/2014 | Leyvand et al. | |
| 9,268,991 B2 | 2/2016 | Russo et al. | |
| 9,471,765 B1 * | 10/2016 | Setterberg .......... | G06K 9/00026 |

(Continued)

FOREIGN PATENT DOCUMENTS

| | | | | |
|---|---|---|---|---|
| SE | 16514929 | * | 11/2016 | ......... G06K 9/00026 |

OTHER PUBLICATIONS

Scheidat et al., "Automatic Template Update Strategies for Biometrics", May 2007, Otto-von-Guericke University Magdeburg, Technical Report, p. 1-5. (Year: 2007).*

(Continued)

*Primary Examiner* — Vincent Rudolph
*Assistant Examiner* — Timothy Choi
(74) *Attorney, Agent, or Firm* — Leydig, Voit & Mayer, Ltd.

(57) ABSTRACT

Systems and methods for updating an enrollment template having a plurality of enrollment views of a biometric input object. A determination is made as to whether a new input biometric view is a candidate view for template update based on a match criterion, and a determination is made as to whether the new input biometric view increases coverage of the biometric input object by the enrollment template. The new input biometric view is added to the enrollment template as a new enrollment view in response to determining that the new biometric view i) is a candidate view for template update, and ii) increases coverage of the biometric input object by the enrollment template.

19 Claims, 15 Drawing Sheets

(56) References Cited

U.S. PATENT DOCUMENTS

| | | | |
|---|---|---|---|
| 9,508,022 | B2 | 11/2016 | Russo et al. |
| 9,646,192 | B2* | 5/2017 | Cheng ................. G06K 9/00033 |
| 2005/0129291 | A1* | 6/2005 | Boshra ............... G06K 9/00026 382/124 |
| 2009/0219154 | A1 | 9/2009 | Kukula et al. |
| 2011/0158536 | A1* | 6/2011 | Nakano .............. G06K 9/00281 382/190 |
| 2012/0013436 | A1 | 1/2012 | Niinuma |
| 2013/0259330 | A1* | 10/2013 | Russo ................. G06K 9/00087 382/124 |
| 2013/0272586 | A1 | 10/2013 | Russo |
| 2014/0050373 | A1* | 2/2014 | Kiyosawa .......... G06K 9/00268 382/118 |
| 2014/0067679 | A1 | 3/2014 | O'Reilly et al. |
| 2015/0078629 | A1 | 3/2015 | Gottemukkula et al. |
| 2015/0227740 | A1 | 8/2015 | Boshra et al. |
| 2016/0044241 | A1* | 2/2016 | Kaida ................... G06T 3/4038 348/36 |
| 2016/0328596 | A1 | 11/2016 | Midgren et al. |
| 2018/0137332 | A1* | 5/2018 | Andersen ............. G06K 9/0002 |

OTHER PUBLICATIONS

Freni et al., "Replacement Algorithms for fingerprint template update", Jun. 2008, Springer-Verlag, ICIAR 2008: Image Analysis and Recognition, LNCS 5112, p. 884-893. (Year: 2008).*

Rattani et al., "Template Update Methods in Adaptive Biometric Systems: A Critical Review", Springer-Verlag, ICB 2009 Advances in Biometrics, LNCS 5558, p. 847-856. (Year: 2009).*

Kim, Kio, Nicola Neretti, and Nathan Intrator. "MAP Fusion Method for Superresolution of Images with Locally Varying Pixel Quality." *International Journal of Imaging Systems and Technology*, (2008), 242-250, vol. 18, Issue 4, Wiley Periodicals Inc.

Uludag, Umut, Arun Ross, and Anil Jain. "Biometric template selection and update: a case study in fingerprints." *Pattern Recognition* 37.7 (2004): 1533-1542.

Noval, Ricardo Garcia, and Francisco Perales LóPEZ. "Adaptative templates in biometric authentication." *The 16th International Conference in Central Europe on Computer Graphics, Visualization and Computer Vision*. vol. 2008. 2008.

Roli, Fabio, Luca Didaci, and Gian Luca Marcialis. "Adaptive biometric systems that can improve with use." *Advances in Biometrics*. Springer London, 2008. 447-471.

Pagano, C., et al. "Context-sensitive self-updating for adaptive face recognition." *Adaptive Biometric Systems*. Springer International Publishing, 2015. 9-34.

Roli, Fabio, Luca Didaci, and Gian Luca Marcialis. "Template co-update in multimodal biometric systems." *International Conference on Biometrics*. Springer, Berlin, Heidelberg, 2007.

Bhatt, Himanshu S., et al. "On co-training online biometric classifiers." *Biometrics (IJCB), 2011 International Joint Conference on*. IEEE, 2011.

Heijden, Rens can der, Adaptive Biometrics: a comparative analysis of applications to face recognition, https://namnatulco.eu/work/introduction-to-biometrics-paper.pdf, downloaded from Web Sep. 28, 2017.

Didaci, Luca, Gian Luca Marcialis, and Fabio Roli. "Analysis of unsupervised template update in biometric recognition systems." *Pattern Recognition Letters* 37 (2014): 151-160.

* cited by examiner (63 non-zero pixels)

(46 non-zero pixels)

(44 non-zero pixels)

(56 non-zero pixels)

(59 non-zero pixels)

BIOMETRIC TEMPLATE UPDATING SYSTEMS AND METHODS

FIELD

The present disclosure generally relates to systems and methods for biometric recognition, and more particularly to biometric enrollment template updating systems and methods.

BACKGROUND

Biometric matching or authentication systems are used for enrolling and authenticating users of devices incorporating the authentication systems. Biometric sensing technology provides a reliable, non-intrusive way to enroll and verify individual identity for authentication purposes.

A common biometric feature used for authentication is a fingerprint. Fingerprints, like certain other biometric characteristics, are based on unalterable personal characteristics and thus are a reliable mechanism to recognize individuals. There are many potential applications for utilization of biometric and fingerprints sensors. For example, electronic fingerprint sensors may be used to provide access control in stationary applications, such as security checkpoints. Electronic fingerprint sensors may also be used to provide access control in portable applications, such as portable computers, personal data assistants (PDAs), cell phones, gaming devices, navigation devices, information appliances, data storage devices, and the like. Accordingly, some applications, in particular portable applications, may require electronic fingerprint sensing systems that are compact, highly reliable, and inexpensive.

In biometric matching and authentication systems, a primary goal is to determine whether a verification view of the biometric feature such as a fingerprint is a match or not with an enrollment template that stores multiple enrollment views of the biometric feature. In general, there are two types of errors associated with biometric recognition: false acceptance and false rejection. False acceptance occurs when there are enough similarities between fingerprints of two different individuals, that one may be mistaken for the other. For example, false acceptance may occur when the verification view of an imposter (a user not associated with the enrollment views) is sufficiently similar to the enrollment view(s) in the enrollment template (associated with a user registered with the system). False acceptance is often quantified by a false acceptance rate ("FAR"). False rejection occurs when the user registered with the system is not identified as the registered user. For example, false rejection may occur when a (registered) user provides an input fingerprint view which is not accepted as matching enrollment views previously provided by the same user. False rejection is often quantified by a false rejection rate ("FRR").

As fingerprint sensors shrink in size, whether for the purpose of packaging them into smaller portable devices, to reduce cost, or for other reasons, accurate and usable fingerprint recognition becomes a challenging task. The fingerprint recognition system should capture a sufficient area of the fingerprint to discriminate between different users.

BRIEF SUMMARY

The present disclosure provides biometric enrollment template updating systems and methods.

According to an embodiment, a method of updating an enrollment template having a plurality of enrollment views of a biometric input object is provided. The method typically includes determining whether a new input biometric view is a candidate view for template update based on a match criteria, determining whether the new input biometric view increases coverage of the biometric input object by the enrollment template, and adding the new biometric view to the enrollment template as a new enrollment view in response to determining that the new biometric view i) is a candidate view for template update, and ii) increases coverage of the biometric input object by the enrollment template. In certain aspects, the biometric input object includes a finger, and each enrollment view corresponds to a portion of a fingerprint of the finger. In certain aspects, the adding includes replacing a first one of the plurality of enrollment views with the new input biometric view in response to determining that the first enrollment view is a most redundant view in the enrollment template. In certain aspects, the determining the most redundant view in the enrollment template includes computing a sum-mosaic view of the plurality of enrollment views in the enrollment template, wherein each pixel in the sum-mosaic view has a value representing a number of the enrollment views overlapping at that pixel position, and for each of the plurality of enrollment views, removing the enrollment view from the sum mosaic view and computing a number of sum-mosaic pixels having a non-zero value, and determining the most redundant view as the enrollment view, which when removed from the sum-mosaic corresponds to a largest number of sum-mosaic pixels having a non-zero value remaining.

According to another embodiment, a method of verifying a new input biometric view is provided. The method typically includes comparing the new input biometric view to an enrollment template having a plurality of enrollment views, computing a matching score based on the comparing, determining whether the matching score satisfies a threshold, and indicating a biometric match in response to determining that the matching score satisfies the threshold, wherein the threshold is correlated to a number of the plurality of enrollment views in the enrollment template. In certain aspects, that the threshold is correlated to a number of the plurality of enrollment views in the enrollment template includes that the threshold is a function of the number of the plurality of enrollment views in the enrollment template and increases in stringency as the number of enrollment views in the enrollment template increases.

According to yet another embodiment, a method of localizing a new biometric view in a biometric enrollment template having a plurality of template views is provided. The method typically includes aligning a new biometric view to a first template view in the biometric enrollment template, obtaining a composed transformation between the new biometric view and a second template view in the biometric enrollment template connected to the first template view from a transformation between the first template view and the second template view, and aligning the new biometric view to a third template view in the biometric enrollment template, wherein the third template view is not connected to the first template view or the second template view. In certain aspects, a component comprises one or more connected views, and the method further includes connecting via the new biometric view a first component corresponding to the first template view with a second component corresponding to the third template view.

According to a further embodiment, a method of managing connection information in a biometric enrollment template having a plurality of enrollment views is provided. The method typically includes removing a first enrollment view from the biometric enrollment template, and storing a virtual connection corresponding to the first enrollment view after the removing, wherein the virtual connection includes information connecting other views in the biometric enrollment template. In certain aspects, the storing the virtual connection includes computing connection information linking the first enrollment view with one or more other enrollment views in the enrollment template, and after the first enrollment view is removed, storing the connection information in the biometric enrollment template or maintaining the connection information in the biometric enrollment template.

According to still a further embodiment, an electronic device for biometric recognition of a biometric input object is provided. The electronic device typically includes a biometric sensor configured to sense a biometric input object proximal to an input surface of the biometric sensor, a memory for storing a biometric enrollment template including a plurality of enrollment views of the biometric input object, and a processing system comprising one more processing elements, and a processing system coupled to the memory and to the biometric sensor. The processing system is typically configured to receive a new input biometric view from the biometric sensor, determine whether the new input biometric view is a candidate view for updating the biometric enrollment template based on a match criteria, determine whether the new input biometric view increases coverage of the biometric input object by the biometric enrollment template, and add the new biometric view to the biometric enrollment template as a new enrollment view in response to determining that the new biometric view i) is a candidate view for updating the biometric enrollment template, and ii) increases coverage of the biometric input object by the biometric enrollment template.

According to yet an additional embodiment, a non-transitory computer readable medium storing instructions for updating a biometric enrollment template stored in a memory coupled to a processing system is provided, where the biometric enrollment template has a plurality of enrollment views of an input biometric object. The instructions, when executed by the processing system, typically cause the processing system to receive a new input biometric view from a biometric sensor coupled with the processing system, determine whether the new input biometric view is a candidate view for updating the biometric enrollment template based on a match criteria, determine whether the new input biometric view increases coverage of the biometric input object by the biometric enrollment template, and add the new biometric view to the biometric enrollment template as a new enrollment view in response to determining that the new biometric view i) is a candidate view for updating the biometric enrollment template, and ii) increases coverage of the biometric input object by the biometric enrollment template.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE SEVERAL VIEWS OF THE DRAWING(S)

The detailed description is described with reference to the accompanying figures. The use of the same reference numbers in different instances in the description and the figures may indicate similar or identical items.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present disclosure provide input devices and methods that facilitate improved usability.

Figure 1:
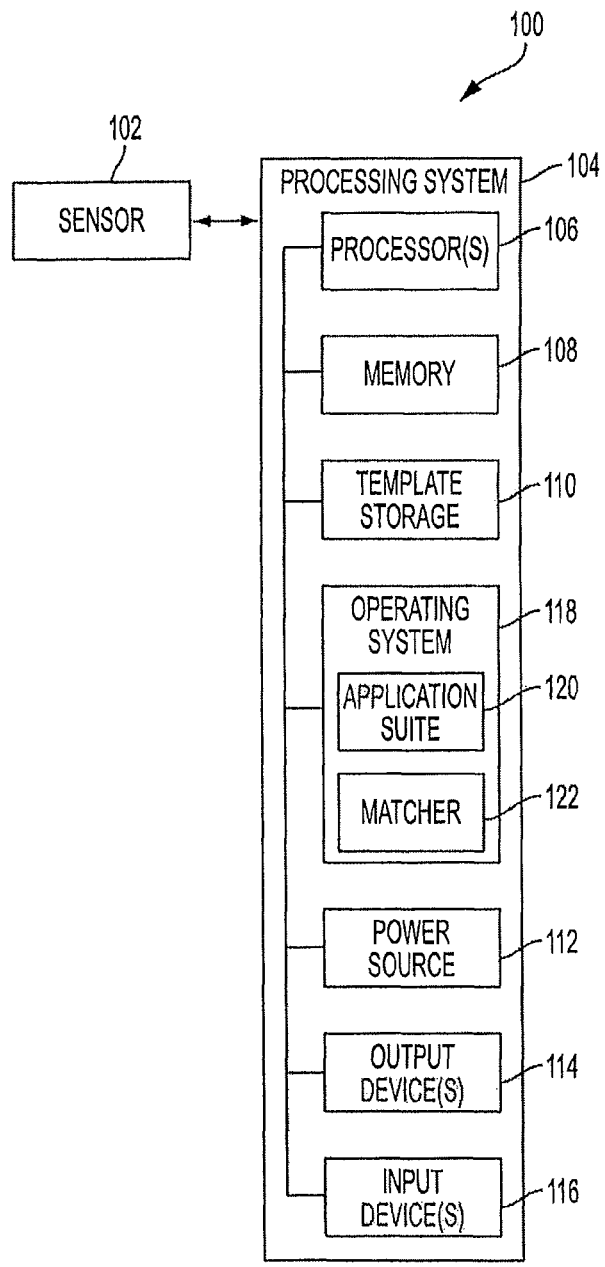
FIG. 1 is a block diagram of an electronic system or device that includes an input device such as sensor and processing system, in accordance with an embodiment of the disclosure.

Turning now to the figures, FIG. 1 is a block diagram of an electronic system or device 100 that includes an input device such as sensor 102 and processing system 104, in accordance with an embodiment of the disclosure. As used in this document, the term "input device" and "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic devices include composite input devices, such as physical keyboards and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the processing system 104 could be a host or a slave to the sensor 102.

Sensor 102 can be implemented as a physical part of the electronic device 100, or can be physically separate from the electronic device 100. For example, sensor elements of sensor 102 may be integrated in a display device that is itself implemented as a physical part of the electronic device 100 or communicably coupled with the electronic device 100. As appropriate, the sensor 102 may communicate with parts of the electronic device 100 using any one or more of the following communication interconnections: buses, networks, and other wired or wireless interconnections. Examples include $I^2C$, SPI, PS/2, Universal Serial Bus (USB), Bluetooth, RF, and IRDA.

Generally, sensor 102 will be utilized as a biometric sensor utilizing one or more various electronic biometric feature sensing methods, techniques and devices to capture a biometric image of a user. One example of a biometric feature is a fingerprint; the biometric sensor 102 will be referred to herein as a fingerprint sensor 102, however, one skilled in the art will understand its applicability to other biometric features. Generally, fingerprint sensor 102 may utilize any type of technology to capture a user's fingerprint. For example, in certain embodiments, the fingerprint sensor 102 may be an optical, capacitive, thermal, pressure, radio frequency (RF) or ultrasonic sensor.

In some embodiments, the sensor 102 is a capacitive fingerprint sensor, with the traces that form a 2D grid array, e.g., with rows of transmitter/receiver traces on one substrate and columns of receiver/transmitter traces on the same or a separate substrate, e.g., laminated together with some form of dielectric between the traces to form a 2D sensor element array.

Furthermore, biometric image sensors, such as fingerprint sensors, are sometimes referred to as "swipe" sensors or "placement" sensors depending on their principle of operation. Typically, swipe sensors capture an image that is larger than the sensing area by capturing a series of scans of the fingerprint as the user swipes their finger over the sensing area. In some applications, a processing system may reconstruct the scans into a larger swipe image. Since the image may be reconstructed from a series of scans, this allows the sensing array to be made small, even as small as a single scan line, while still capturing a larger area image. In some applications, a larger image area can be stored as a series of scans using a map or mapping function that correlates the various scan images. Placement sensors typically capture an image that corresponds to the size of the sensing area by capturing scans of the fingerprint as it is placed or otherwise held over the sensing area. Usually, placement sensors include a two dimensional sensor array that can capture a sufficient area of the fingerprint in a single scan, allowing the fingerprint image to be captured without the user having to move the finger during the image capture process.

Placement sensors have an active sensing surface or in other terms, sensing area, that is large enough to accommodate a portion of the relevant part of the fingerprint of the finger during a single scan or sensing action. Where the relevant part of the fingerprint is less than the full fingerprint, this is referred to herein as a "partial" fingerprint sensor. Partial fingerprint placement sensors can be made very small and still reliably recognize fingerprints with sophisticated matching schemes. Typically, for placement sensors, the finger is held stationary over the sensing area during a measurement. During a fingerprint enrollment process, multiple views of the fingerprint image may be captured.

Generally, swipe sensors can be made smaller in size than placement sensors that capture an equivalent fingerprint area, and require the finger to be moved over the sensor during a measurement. Typically, the finger movement will be either 1D in that the finger moves in a single direction over the sensor surface, or the finger movement can be 2D in that the finger can move in more than one direction over the sensor surface during a measurement. In certain embodiments of this disclosure, a placement sensor may be operated in a swipe mode. In these embodiments, a placement sensor may capture a swipe image by capturing a series of scans during relative motion between the sensor array and the user's fingerprint, and the series of scans are reconstructed into a larger area swipe image. In one implementation, the placement sensor captures the scans using its entire sensor array. In another implementation, the placement sensor looks to only a subset of pixels in its sensor array, such as one or two scan lines, when capturing the swipe image.

Turning now to the processing system 104 from FIG. 1, basic functional components of the electronic device 100 utilized during capturing and storing a user fingerprint image are illustrated. The processing system 104 includes a processor 106 (or multiple processors), a memory 108, a template storage 110, a power source 112, an output device(s) 114, an input device(s) 116 and an operating system (OS) 118 hosting an application suite 120 and a matcher 122. Each of the processor 106, the memory 108, the template storage 110, the power source 112, the output device(s) 114, the input device(s) 116 and the operating system 118 are interconnected physically, communicatively, and/or operatively for inter-component communications.

As illustrated, processor(s) 106 is configured to implement functionality and/or process instructions for execution within electronic device 100 and the processing system 104. For example, processor 106 executes instructions stored in memory 108 or instructions stored on template storage 110. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. The template storage 110 is generally configured to store enrollment data including registration or enrollment views for fingerprint images for a user's fingerprint as well as transformation data and localization data linking or relating the various stored views. A transformation may be referred to herein as a "transform" or an "edge," where edge refers to connectivity information linking two nodes (e.g., views) in a transformation graph such as a template graph. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The processing system 104 includes one or more power sources 112 to provide power to the electronic device 100, and in some embodiments to sensor 102. Non-limiting examples of power source 112 include single-use power sources, rechargeable power sources, and/or power sources developed from nickel-cadmium, lithium-ion, or other suitable material.

The processing system 104 includes one or more input devices 116. Input devices 116 are configured to receive input from a user or a surrounding environment of the user through tactile, audio, and/or video feedback. Non-limiting examples of input device 116 include a presence-sensitive screen, a mouse, a keyboard, a voice responsive system, video camera, microphone or any other type of input device. In some examples, a presence-sensitive screen includes a touch-sensitive screen. In certain embodiments, the sensor 102 may be included as an input device 116.

One or more output devices 114 are also included in processing system 104. Output devices 114 are configured to provide output to a user using tactile, audio, and/or video stimuli. Output device 114 may include a display screen (e.g., part of the presence-sensitive screen), a sound card, a video graphics adapter card, or any other type of device for converting a signal into an appropriate form understandable to humans or machines. Additional examples of output device 114 include a speaker such as headphones, a cathode ray tube (CRT) monitor, a liquid crystal display (LCD), or any other type of device that can generate intelligible output to a user.

The processing system 104 also hosts an operating system 118. The operating system 118 controls operations of the components of the processing system 104. For example, the operating system 118 facilitates the interaction of the processor(s) 106, memory 108, template storage 110, power source 112, output devices 114 and input devices 116. The operating system 118 further hosts the application suite 120. The application suite 120 contains applications utilizing data stored on the memory 108 and/or the template storage 110 or data collected from input devices 112 or the sensor 102 to cause the processing system 104 to perform certain functions, e.g., the various template updating functions including the matching functions, verification functions and localization functions, as described herein.

In certain embodiments, the application suite 120 hosts an enroller application, which functions to capture one or more biometric images or views, e.g., images or views of the user's fingerprint. The views or fingerprint images generally contain a partial or full image of the biometric feature(s), e.g., user's fingerprint. For example, the enrollment application may instruct, either explicitly or implicitly, the user to hold or swipe their finger across the sensor 102 for capturing or acquiring the image of the fingerprint. After each requested biometric view is captured, the enrollment application typically stores the captured view in the template storage 110, e.g., as an enrollment view. In certain embodiments, the enrollment application will cause the data representing the captured view to undergo further processing. For instance, the further processing may be to compress the data representing the captured view such that it does not take as much memory within the template storage 110 to store the image.

In certain embodiments, the application suite 120 will also contain applications for authenticating a user of the electronic device 100. For example, these applications may be an OS logon authentication application, a screen saver authentication application, a folder/file lock authentication application, an application lock and a password vault application. In each of these applications, the individual application will cause the operating system 118 to request the user's biometric feature, e.g., fingerprint, for an authentication process prior to undertaking a specific action, such as providing access to the OS 118 during a logon process for the electronic device 100. To perform this process, the above listed applications will utilize the matcher 122 hosted by the operating system 118. The matcher compares authentication view(s) with the views in the enrollment template to determine whether the input view matches the enrollment template. For example, the matcher identifies features of the biometric input view and compares those features with the enrollment template to produce a correlation score; the correlation score may be compared with a threshold value to determine whether user identification or authentication is successful or fails. Various features compared may include fingerprint ridges and fingerprint minutia.

Figure 2B:
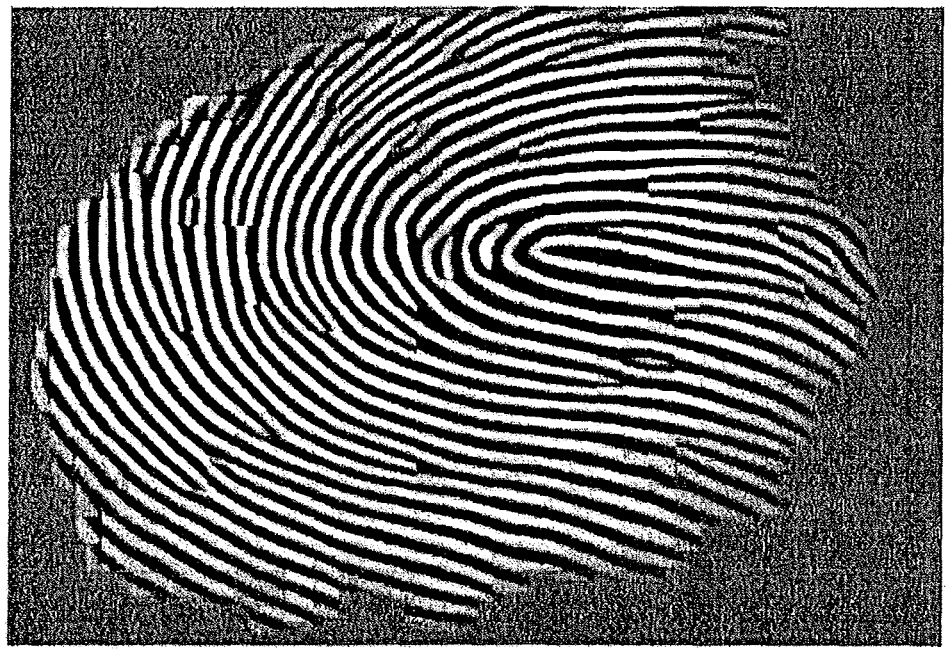
FIG. 2B is an enhanced image of the fingerprint of FIG. 2A.
Figure 2A:
FIG. 2A illustrates a grayscale fingerprint image that shows various ridges and minutiae of a fingerprint, according to an embodiment.

FIG. 2A illustrates a grayscale fingerprint image that shows various ridges and minutiae of a fingerprint, according to one embodiment. As can be seen in FIG. 2A, the image is noisy such that portions of the image are cloudy and the ridges or contours are broken. FIG. 2B is an enhanced image of the fingerprint of FIG. 2A.

Figure 3:
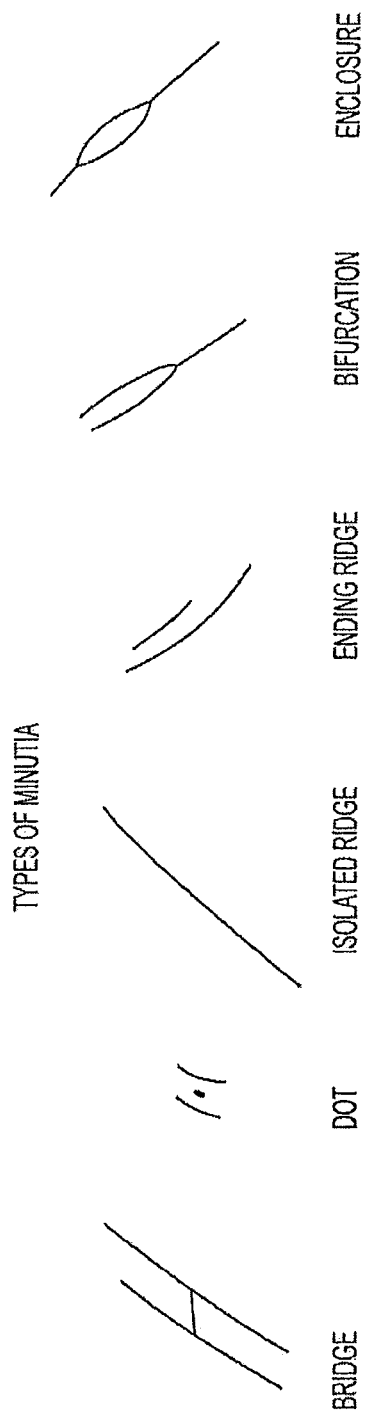
FIG. 3 illustrates various types of fingerprint minutia, according to some embodiments.

FIG. 3 illustrates various types of fingerprint minutia, according to some embodiments. Examples of fingerprint minutia include: a bridge point between two or more ridges, a dot, an isolated ridge, an ending ridge, a bifurcation point, and an enclosure. Other minutia point types not shown in FIG. 3 are also within the scope of the disclosure. Each minutia point in a fingerprint image is associated with a location (in two dimensions) and an orientation. In some embodiments, the orientation of a minutia point corresponds to the tangent of the ridge going through the minutia point.

Figure 4B:
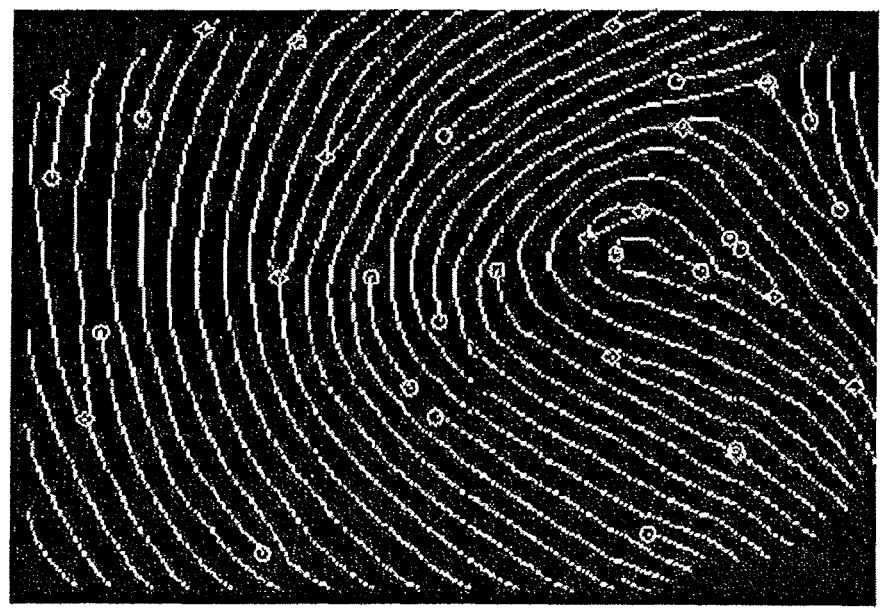
FIG. 4B illustrates a thin-ridge version of the grayscale fingerprint image in FIG. 4A, according to one embodiment.
Figure 4A:
FIG. 4 illustrates a grayscale fingerprint image that shows various ridges and minutiae of a fingerprint, according to one embodiment.

FIG. 4A illustrates a grayscale fingerprint image that shows various ridges and minutiae of a fingerprint, according to one embodiment. FIG. 4B illustrates a thin-ridge version of the grayscale fingerprint image in FIG. 4A, according to one embodiment. Fingerprint skeletonization, also sometimes referred to as an "edge map," "edge image," or "thinned ridge image," depending on the context, is the process of converting the ridge lines in a grayscale fingerprint image (see, for example, the image in FIG. 4A) to a binary representation, and reducing the width of binarized ridge lines to one pixel wide. As can be seen in FIG. 4B, the skeletonized version of the grayscale fingerprint image removes much of the noise so that the image is no longer cloudy and the ridge lines are no longer broken.

Additionally, in embodiments where the sensor 102 (see FIG. 1) is a partial fingerprint sensor such as a partial placement sensor, due to the size of the sensing area of the sensor 102 typically being smaller than the user's fingerprint area, a multitude of input biometric views, or placement images or views, of the user's fingerprint from the placement sensor 102 may be collected to form the enrollment template such that it adequately describes the user's fingerprint. As the multitude of placement images are collected, the enroller function of the application suite 120 calls on the matcher 122 to relate the placement views with each other such that they can be grouped into an accurate composite of the user's fingerprint.

Relating the various placement views to one another requires localization of each placement view, which specifies a location within the user's fingerprint of an individual placement view. In certain embodiments, to assist in localization, the placement image is converted into an orientation representation, which specifies a directional orientation of each ridge of the placement image on a pixel by pixel basis, or at a lower resolution depending on the coarseness used. Essentially, each pixel in a ridge converted to the orientation representation is represented by data describing the orientation or direction of the ridge. Once converted to the orientation representation, the placement image may be referred to as an orientation map. Further, in certain embodiments, prior to converting to the orientation space, the placement image is converted to a thin ridge version of the placement image, and then the thin ridge image is converted to the orientation space. As additional placement images are collected and converted to an orientation space, the matcher 122 (see FIG. 1) will begin to localize each placement view based on ridges having a similar orientation.

Figure 5:
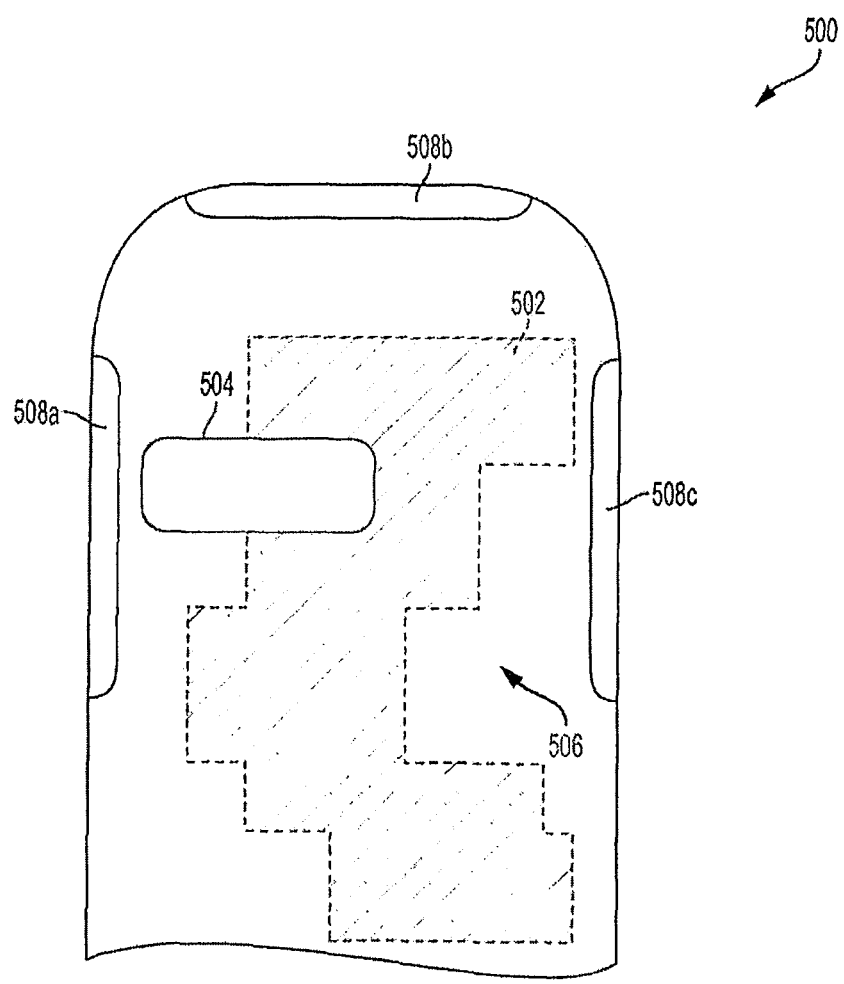
FIG. 5 is an illustration of an exemplary embodiment of a user's fingerprint showing a collection of localized placement views that form a portion of the user's fingerprint.

FIG. 5 is an illustration of an exemplary embodiment of a user's fingerprint 500 showing a collection of localized placement views that form a portion 502 of the user's fingerprint 500. Portions 508*a* and 508*c* represent a side of the fingerprint and portion 508*b* represents a tip of the fingerprint. A recently collected placement view 504 is illustrated in relation to the portion 502. The placement view 504 will be localized in comparison to the portion 502 in order to determine how it fits along with the rest of portion 502. In the illustrated embodiment, placement view 504 overlaps with the portion 502 of the user's fingerprint already localized and collected into the enrollment template. However, in other embodiments, the placement view 504 may not overlap with the portion 502, or only have a small overlap resulting in a low confidence in the alignment, such that localizing the placement view 504 by comparing to previous localized portions of the fingerprint becomes more difficult. In addition, multiple disconnected views or clusters of views may result, and for which reliable alignment becomes difficult without a global reference for localization. As further illustrated, a portion 506 of the user's fingerprint 500 has not been presented to the placement sensor 102 and therefore has not been collected for adding to the enrollment template. However, as the enroller of the application suite 120 and the matcher 122 do not have prior knowledge of the user's fingerprint 500, the portion 506 of the user's fingerprint that has not been collected is an unknown. Therefore, in situations where there is no overlap between the placement view 504 and the collected portion 502, it becomes difficult to locate where the placement view 504 should be located in the uncollected portion 506 in relation to the collected portion 502.

Efficient Coverage Based Template Update Processing

The enrollment process can be tedious and may require many "good" touches by the user, which can be time consuming and onerous to the user. Also, the template memory is usually limited and only a certain number of views or images may be stored in the template storage 110. Typically, information pertinent to the views stored in the template is also stored in the template storage. Such pertinent information typically includes feature sets (e.g., minutia sets, thin-ridges, ridge flows, points, etc.) from the stored views and transformations between the views. Information regarding transformations may include information such as a horizontal transformation, a vertical transformation, and a rotation relative to another view. Additionally, there is no guarantee that the enrollment process will provide sufficient fingerprint coverage.

In one embodiment, fewer views are captured during enrollment and additional views are obtained and the template updated during normal operation, e.g., during an authentication process occurring after enrollment has concluded. This advantageously reduces time spent by the user enrolling a biometric feature.

As used herein, a "template view" will refer to any view stored in the enrollment template, e.g., any placement or enrollment views added to the template during enrollment processing, or any other view stored to the template after enrollment processing has concluded, such as placement views added to the template during authentication or verification processing as discussed herein. The views stored in the template may be referred to collectively as "template views," and the template may be referred to herein as "enrollment template" even though certain of the template views may have been added after enrollment processing has concluded. Also, "template" may be used herein to refer to the coverage of the biometric feature collectively provided by the views stored in the template. An example of collective coverage by multiple views in a template includes the portion 502 of the user's fingerprint 500 in FIG. 5.

In one embodiment, a template update process revises the template at the view level in response to receiving an input biometric view for verification during an authentication or verification process. This new input biometric image or placement view may also be referred to herein as a "verify view" or "verification view". First, a decision rule is followed to determine whether the received verify view is a good candidate view for updating the template. To be considered as a good template update candidate, the verify view should be a true match with the template and improve coverage of the biometric feature in the template, e.g., improve fingerprint coverage. Once a verify view is determined to be a template update candidate, the verify view may be added to the template. If the template consists of maximum number of allowed views, a redundant view is identified and replaced with verify view. If the template consists of fewer than the maximum number of allowed views, the verify view may be added to the template without removal of a view from the template.

Figure 6:
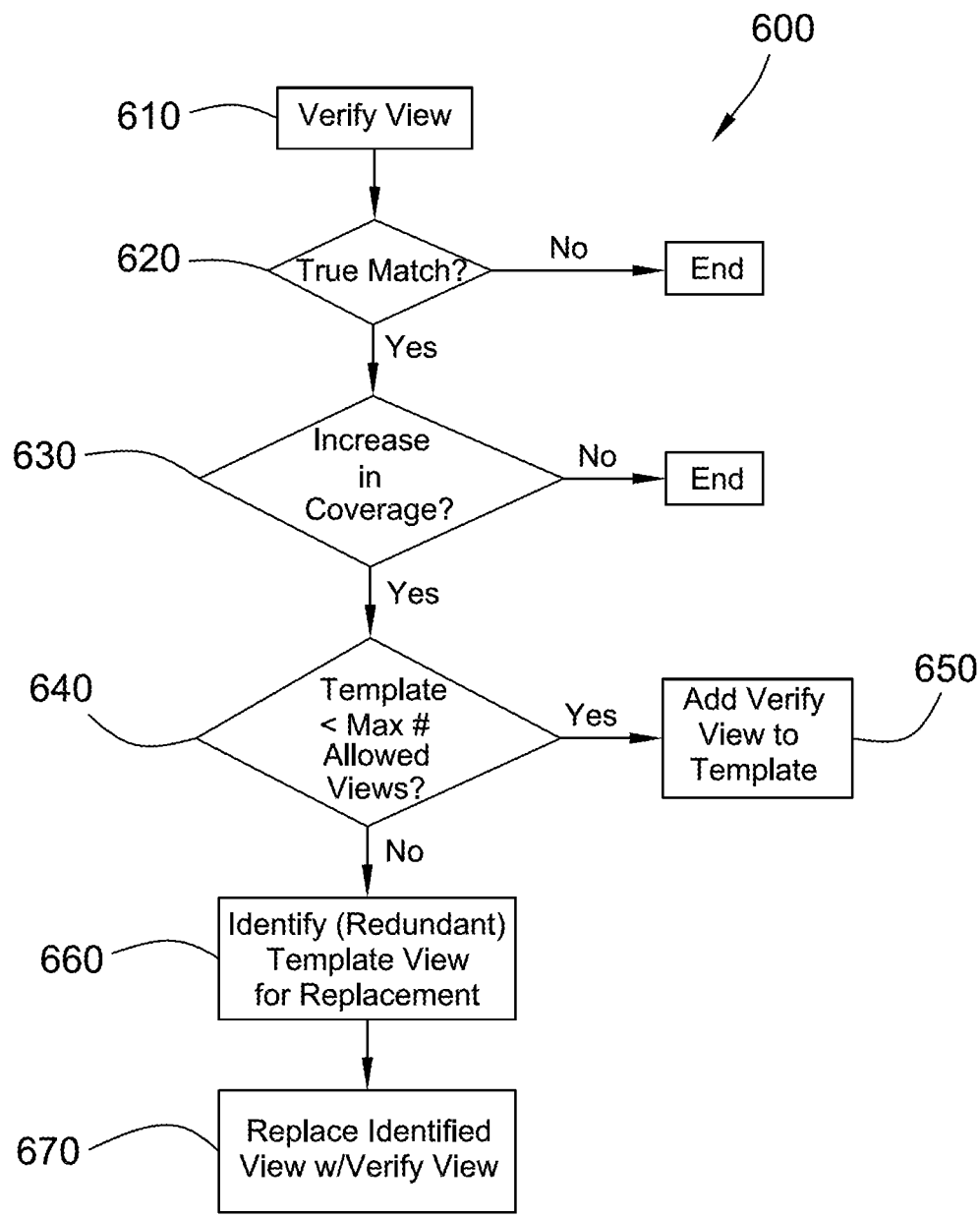
FIG. 6 illustrates a template update process according to an embodiment.

FIG. 6 illustrates a template update process 600 according to an embodiment. In process 600, at step 610, a new input biometric view ("verify view") is received. At step 620, the verify view is processed to determine whether it is a candidate view for updating the template based on whether the verify view is a true match, i.e., satisfies a match criteria with the template views. In one embodiment, for example, a set of two or more match features of the verification view is compared with a corresponding set of two or more match features of the template views to determine a matching score, and the matching score is compared to a threshold value to determine whether the verify view is a true match that satisfies the match criteria. The set of two or more match features may include one or more of a distance measure (e.g., a distance between ridges or other features within a pair of views, a Euclidean distance between pixel values, etc.), a count measure (e.g., a count of the number of minutiae that match), etc. In certain embodiments, the set of two or match features includes a subset, or all, of the features typically used in a verification process by the matcher to determine whether the verify view represents an authentic image based on the template images. In one embodiment, the match threshold value used in step 620 is higher (i.e., more stringent) than the verification threshold value used during the verification process by the matcher. If the verify view is determined to not be a true match, the process ends; otherwise the process proceeds to step 630.

At step 630 a determination is made as to whether the verify view increases coverage of the template, e.g., by at least a minimum amount. For example, in one embodiment, the coverage of the fingerprint that would be added to the template by adding the verify view is calculated and compared to a threshold value. In one embodiment, a mosaic view of the plurality of enrollment views in the enrollment template is computed, where a number of non-zero pixels in the mosaic view represents the total coverage of the plurality of enrollment views in the enrollment template. The mosaic view may be pre-computed, e.g., when the last view was added to the template, and stored in the template storage or other memory, or the mosaic view may be computed in response to receiving the verify view in step 610. Next, the new biometric view (verify view) is added to the mosaic view and an amount of increase in the number of non-zero pixels in the mosaic view is determined. When the amount of increase in the number of non-zero pixels exceeds a threshold value, the verify view is determined to increase coverage of the biometric input object sufficiently to warrant addition of the verify view to the template and the process proceeds to step 640. This threshold value may be preset or adjustable. If the verify view is determined to not increase coverage sufficiently, the process ends.

At step 640 a determination is made as to whether the template contains fewer than an allowable number of views storable in the enrollment template. If it is determined that the template contains fewer than an allowable number of views storable in the template, the verify view is added to the template at step 650.

In one embodiment, step 650 is performed in response to a determination that the template contains a maximum number of views storable in the template. That is, in this embodiment, step 630 is ignored (optional) and the new verify view is added to the template at step 650 if it is determined to be a true match in step 620 and the template contains fewer than an allowable number of views storable in the template.

If it is determined in step 640 that the template does not contain fewer than an allowable number of views storable in the template, i.e., contains the maximum number of allowable views, the process proceeds to step 660. At step 660, one of the stored template views is identified for replacement and at step 670, the identified template view is replaced by the verify view. In one embodiment, any view in the template may be identified and replaced by the verify view, however, this may not result in an efficient template update process. Accordingly, in another embodiment, at step 660, a most redundant view in the template is identified for replacement by the verify view at step 670. A most redundant view is, in certain aspects, a view which if removed from the template results in the least amount of change in coverage compared with removal of any other template view.

To determine a most redundant view in step 660, in one embodiment, for each of the N views stored in the template, a mosaic view is built using the N−1 remaining views with the considered view removed; the N−1 views are added together to create the mosaic view, where each pixel in the mosaic represents coverage or not, e.g., each pixel having a value of "0" for no coverage by any view, or by "1" for coverage by one or more views. This process results in N mosaic views, each with one of the N views removed. The number of non-zero pixels in each mosaic view is the coverage resulting in removing the considered template view. The mosaic view having the smallest number of non-zero pixels represents the most redundant view. This process can, however, be computationally expensive, requiring N total mosaic views to be built.

According to another embodiment for determining a most redundant view in step 660, a single sum-mosaic view, or histogram representation, of the template views is computed, where each pixel position in the sum-mosaic view has a value representing the number of the template views covering or overlapping at that pixel position, e.g., each pixel may have a value of "0" for no coverage by any view, or "1" for coverage by only one view, or "2" for coverage by two views overlapping at that pixel position, or "3" for coverage by three views overlapping at that pixel position, etc. For each of the N views in the template, the considered view is removed from the sum mosaic view and a number of sum-mosaic pixels having a non-zero value is computed for the considered view. The most redundant view is determined as the (removed) view, which when removed, results in a largest number of sum-mosaic pixels having a non-zero value remaining (i.e., least change in template coverage after removing that view). It should be appreciated that not all N views of the template need to be processed to determine a most redundant view; rather, a subset of the N template views may be processed to determine a most redundant view.

Figure 7A:
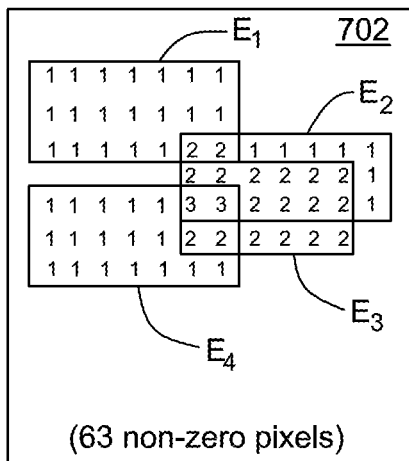
FIG. 7A illustrates a simplistic example representation of a sum-mosaic view derived from a template including 4 views (E1, E2, E3 and E4).
Figure 7E:
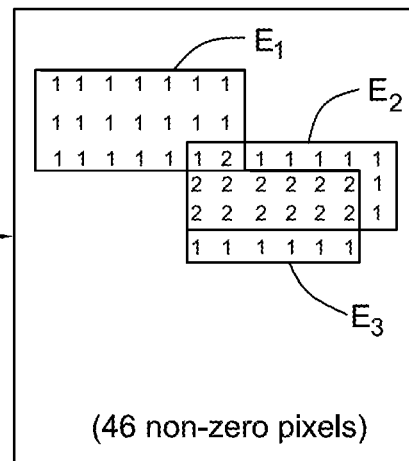
FIGS. 7B, 7C, 7D and 7E represent results of removal of views E1, E2, E3 and E4, respectively, from the sum-mosaic view shown in FIG. 7A.
Figure 7B:
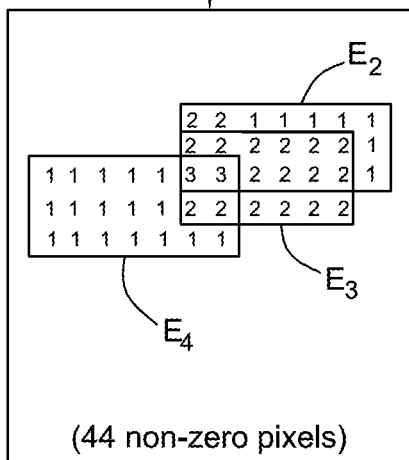
Figure 7C:
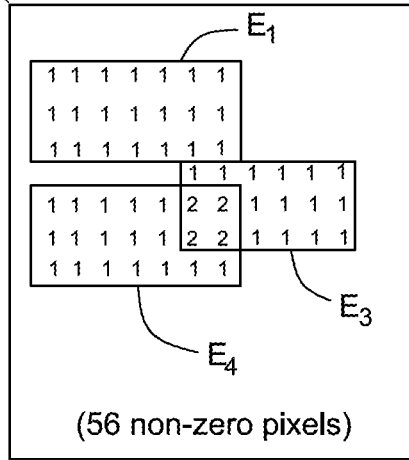
Figure 7D:
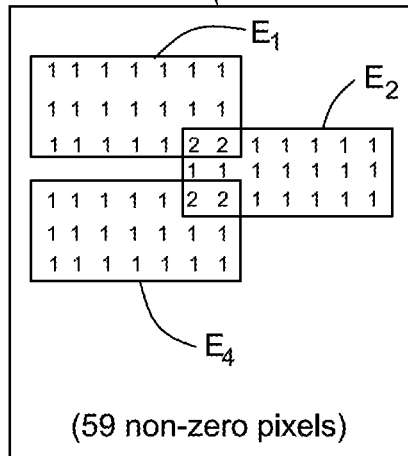

FIG. 7A illustrates a simplistic example representation of a sum-mosaic view derived from a template including 4 views (E1, E2, E3 and E4). As shown, in FIG. 4A, the sum-mosaic view representation includes 63 non-zero pixels, with pixel value "1" representing a single view at that pixel position, pixel value "2" representing two views overlapping at that pixel position and pixel value "3" representing 3 pixels overlapping at that position. The pixels outside of the template views E1-E4, but within the window 702 encompassing the template views, all have a value of zero. To determine a most redundant view from among views E1, E2, E3 and E4, each view is separately removed from the sum-mosaic and the number of non-zero pixels remaining is counted. FIGS. 7B, 7C, 7D and 7E represent results of removal of views E1, E2, E3 and E4, respectively, from the sum-mosaic view shown in FIG. 7A. As can be seen in FIG. 7D, removal of view E3 results in the most number of non-zero pixels (59 non-zero pixels) remaining, compared with removal of E1 (44 non-zero pixels remaining), E2 (56 non-zero pixels remaining), and E4 (46 non-zero pixels remaining). Accordingly, in this simplistic example, view E3 is the most redundant view in the template. In some embodiments, to reduce computations further, a low-resolution version of the sum-mosaic view may be used by sub-sampling points/pixels of the template views. For example, a 50 by 150 pixel window may be reduced down to a 25 by 75 pixel window, or a 10 by 30 pixel window as examples.

In certain embodiments, after adding the verify view to the template at step 650, or removing and replacing a template view at step 670, the transforms between the template views may be recomputed and stored to maintain consistency. It should be appreciated that these embodiments provide computational efficiencies for determining redundant views for removal from the template.

Additionally, the process of FIG. 6 has been found to advantageously improve the performance of the matcher 122. For example, the process advantageously reduces the overall FRR of the matcher (e.g., by about 1% (from 2.5% to 1.5%)), at the same FAR (which amounts to about a 40% improvement over the baseline).

In certain aspects, the new verify view received at step 610 is compared to the enrollment template, and the verify view is authenticated (or not) based on the comparison, as is well known. In certain aspects, the new view received in step 610 is acquired passively during normal device operation or user interface interaction without regard to authentication, e.g., the user may be manipulating a touch screen that includes an integrated fingerprint sensor, and the template is updated in the background if a fingerprint touch produces a view that satisfies the requirements of process 600.

Simultaneous Matching and Verification View Localization

It can be beneficial to localize the relative position of a verify view with respect to the template views. Knowledge of the relative position of the verify view with respect to the template can have a variety of uses. During enrollment of a fingerprint, for example, feedback may be provided to the user to enroll different fingerprint regions, if the relative position of every new fingerprint view with respect to previous views is known. During fingerprint template update, as another example, the fingerprint coverage can be estimated and a decision whether to accept the verification image in the template and/or replace an existing template view may be made. To accomplish this, one approach includes matching the new verify view to all the existing template views and obtaining a transformation (if such transformation(s) exist). However, high computation time is a significant bottleneck in this approach to localize the verify view relative to all template views. According to certain embodiments, methods to efficiently match and localize the new fingerprint view (e.g., a verify view in the verification stage or new enrollment view in the enrollment stage) with respect to the template views are provided.

In one embodiment, simultaneous match and localization involves matching the new view to each of the template views, and determining the alignments for each match. However, this approach may be computationally expensive as true match time increase can be significant. In another embodiment, matching template views is stopped after finding one good true match. However, such an "early out" approach may be unable to localize views in addition to matching. This approach may also disconnect template graph connections which could impact matcher performance with more use.

According to another embodiment, a method is provided that advantageously reduces the number of matching operations without compromising matcher performance while simultaneously obtaining the relative position of the new view with respect to the current template views (localization). Given a new view V, view V is matched to every view in the template in an order until it is determined that the new view V is a true match. If V is an impostor and is never determined to be a true match, view V may neither be matched nor localized with respect to the template. For a template having N views (with V is assumed to be a true match), after the kth alignment, once V is determined to be a true match (using Neural net scoring criterion or any other matching method), match processing ends and processing proceeds with only obtaining alignments to the remaining N−k template views as the match is already determined from the previous k views.

Figure 8:
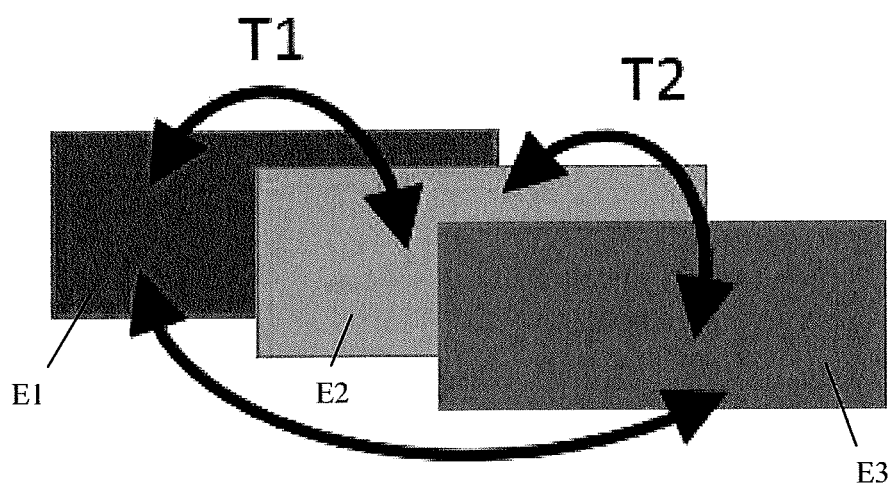
FIG. 8 shows an example of a composed transform according to an embodiment.

These alignments can be efficiently obtained by maintaining and utilizing a template graph or the connectivity among the different views in the template. From this template connectivity graph, a list of connected components can be obtained. A connected component is a set of nodes (views) where the alignments are known across every pair of views. Each template view belongs to a specific connected component. For these N−k template views, if the verification view has an alignment to at least one view in its component, the alignment may be obtained using composed transforms, otherwise the alignment may be computed. Using composed transforms (shown in FIG. 8) to determine alignments significantly reduces the true match time compared to computing the alignment by utilizing view information. FIG. 8 shows an example of a composed transform according to an embodiment. As shows T1 represents the transform linking or aligning view E1 and view E2, and T2 represents the transform linking or aligning view E2 with E3. T3 represents a composed transform aligning view E1 with view E3 and is a composition of transforms T1 and T2 (e.g., for simple horizontal and vertical translations, T3 is a summation of the horizontal and vertical translations of T1 and T2).

Figure 9A:
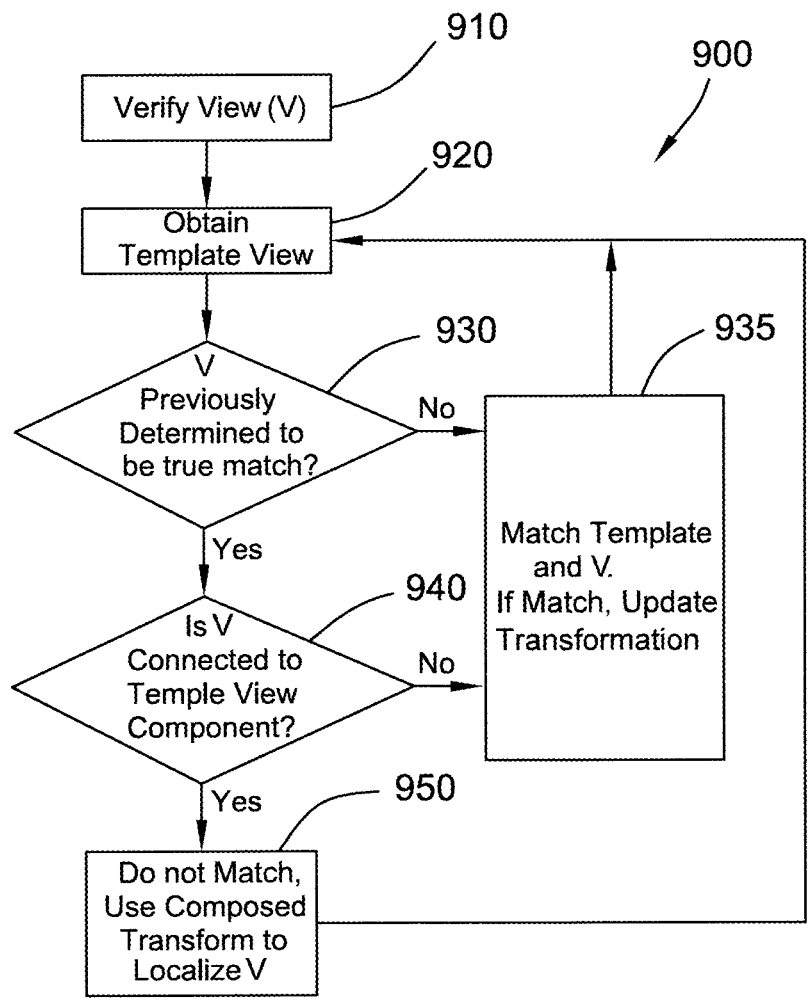
FIG. 9A is a flowchart that represents an algorithm for simultaneous verify view localization and matching according to an embodiment.

FIG. 9A is a flowchart that represents and process 900 for simultaneous verify view localization and matching according to an embodiment. Generally, for a given verify view, a determination is made as to whether the verify view is a match to the template views and simultaneously the verify view's position relative to the template views is localized. Process 900 advantageously achieves these two goals together in an efficient manner. At step 910, a verify view is received. At step 920 a template view is retrieved from the template database (e.g., template storage 110). At step 930, given the kth template view from the template database, a check is made whether the verify view has been determined to be a true match from the previous k−1 template views. If the verify has not been determined to be a true match, the process proceeds to step 935 where the verify view is matched to the template view. Transformations between the template view and the verify view are determined and stored to the template if a match is determined at step 935. Thereafter, the process returns to step 920 to retrieve another template view.

At step 930, if the verify view is already determined to be a true match, then at step 940 a check is made to determine whether the verify view is connected to at least one view in the template graph associated with the considered template view (e.g., connected to a view that is part of the template view's component). If there is a connection, at step 950 the considered template view is not matched to the verify view and the relative position of template view with respect to the verify view is obtained using composed transforms. Otherwise, the verify view is matched to the considered template view and a template-verify transformation is obtained at step 935. Thereafter, the process returns to step 920 to retrieve another template view. The process proceeds until all k template views have been considered.

Figure 9B:
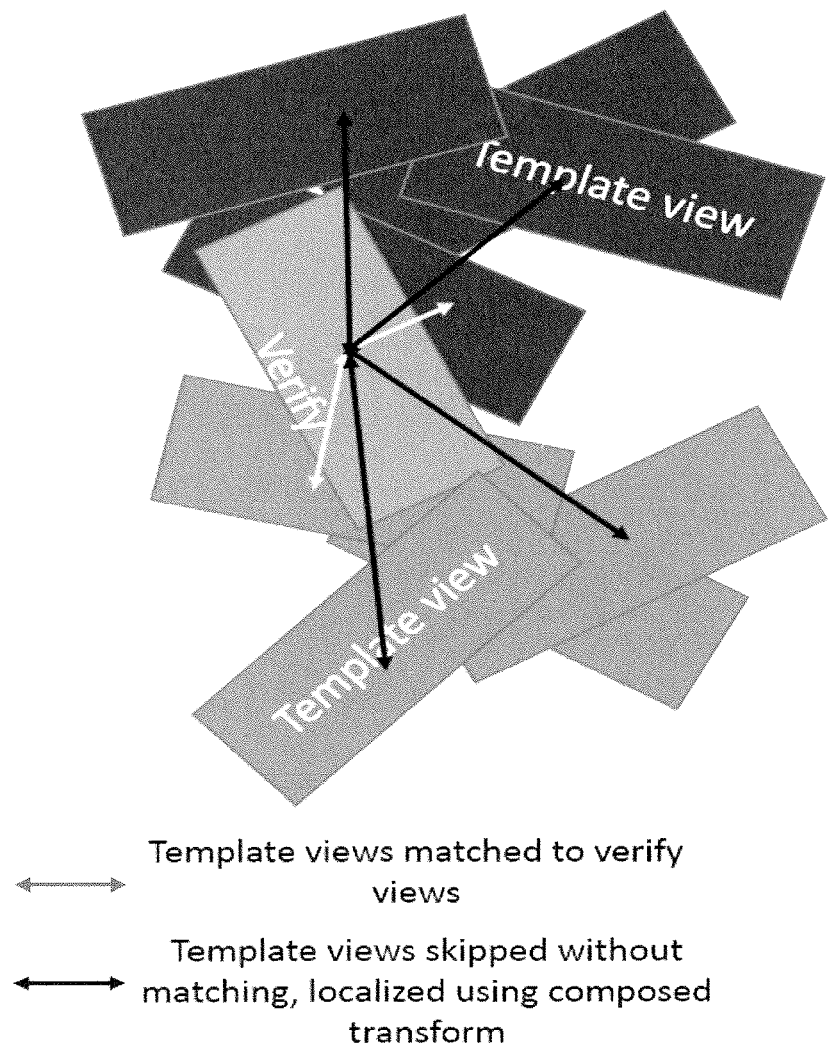
FIG. 9B shows examples of template-view images which are matched and those that were skipped during matching.

FIG. 9B shows examples of template views which were matched to a verify view and template views that were skipped during matching. For template views skipped during matching, the verify view is localized using a composed transform based on a template view that was matched. For example, a composed transform linking the verify view to template view E5 (which was skipped during matching) is obtained using a transform linking template view E1 (which was matched to the verify view and for which a transform linking to the verify view exists) with template view E5. Avoiding matching of a template view to a verify view, especially when a composed transformation can be obtained using the template graph, advantageously improves overall true match speed in addition to obtaining reliable verify view localization with respect to the template.

Figure 10:
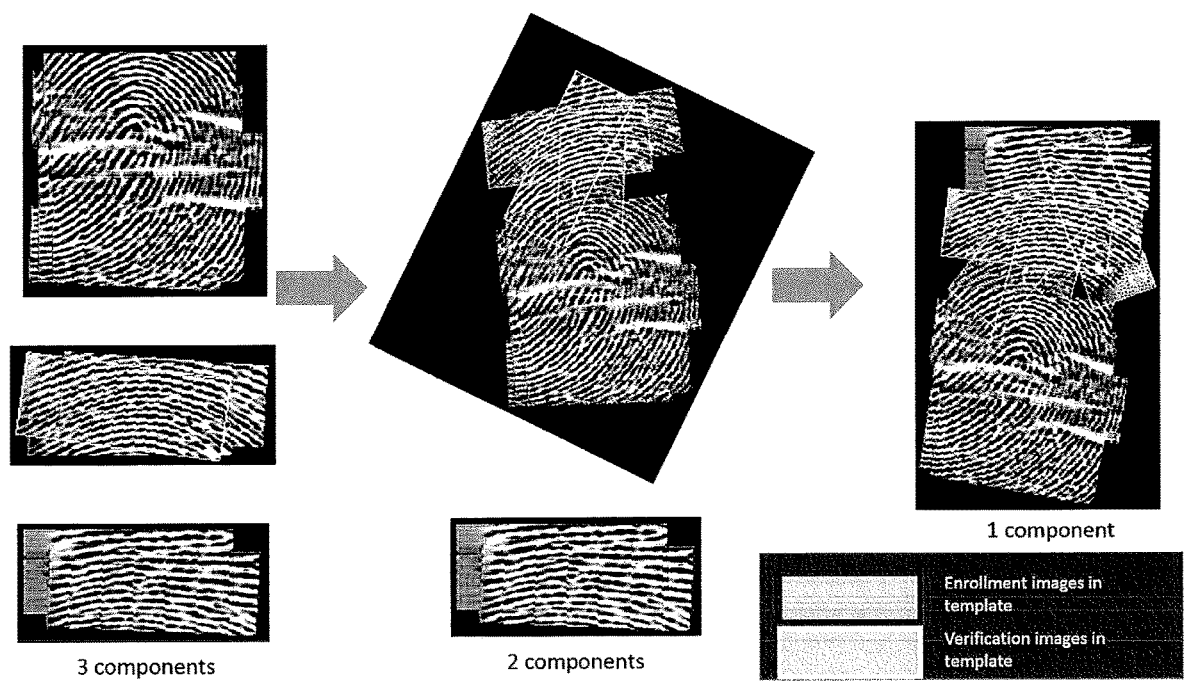
FIG. 10 shows an example of connecting multiple components according to an embodiment.

This embodiment advantageously provides improved template fidelity, improved matcher performance, and improved localization timing (e.g., reduction in time needed to localize a view). The embodiments herein also are able to connect multiple components during template update, which is advantageous as multi-view and template-update in the matcher depends on a reliable template graph. An example of how the embodiments herein connect multiple components is shown in FIG. 10. In the example shown in FIG. 10, three components are eventually connected by multiple template updates to form one single component, which is desirable.

Figure 11:
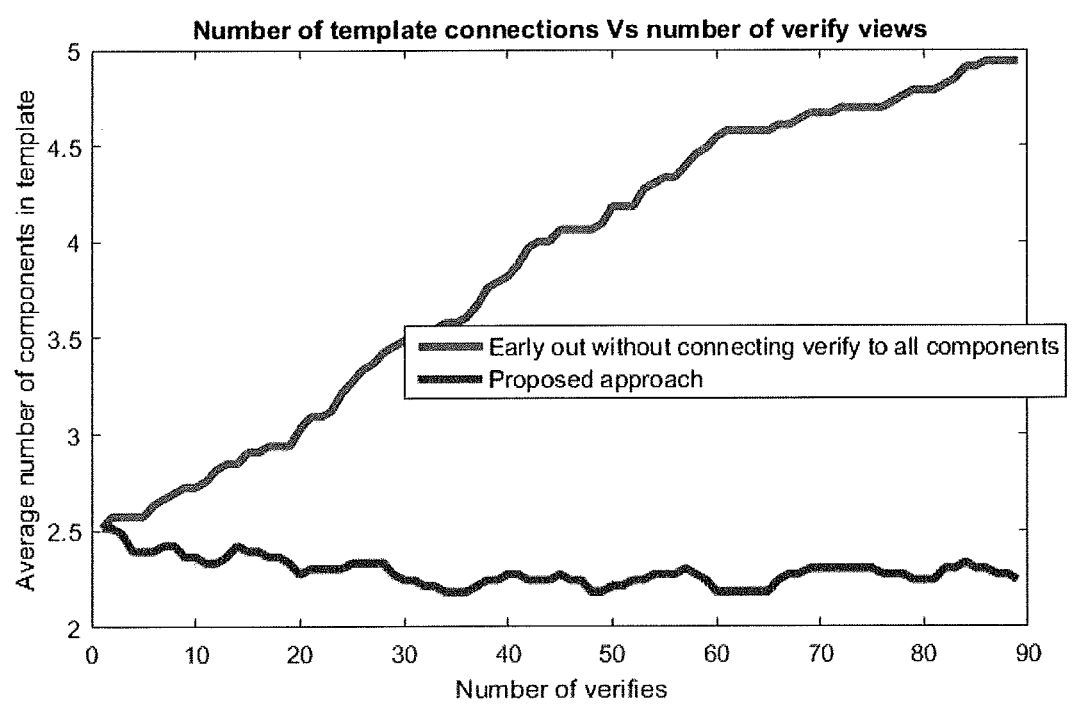
FIG. 11 shows a comparison of the number of components with respect to the number of verifies during template update and "early-out" processing.

These embodiments also advantageously ensure that the number of components roughly remains the same as in the enrollment stage. If the template graph is not accurately maintained and 'early-out' is implemented, template graph tends to become disconnected. A comparison of the number of components with respect to the number of verifies during template update and "early-out" is shown in FIG. 11. As can be seen, the present embodiments maintain connectivity of the template graph during template update. Additionally, the matcher performance in terms of FRR and FAR is improved in comparison with the "early out" approach.

Use of Virtual Edges to Enhance Template Connectivity

Figure 12:
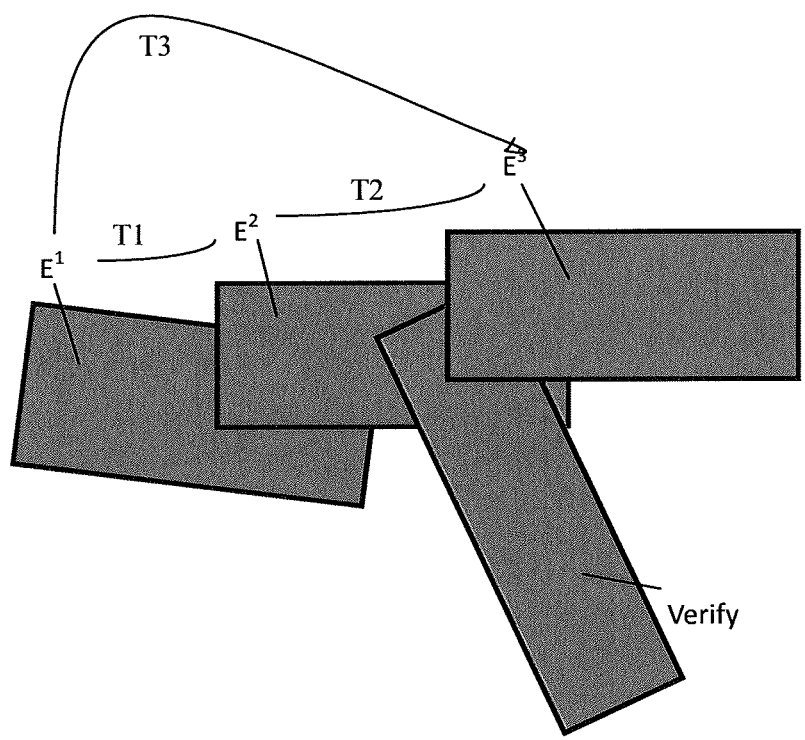
FIG. 12 shows estimation of template coverage using virtual edges according to an embodiment.

As discussed above, template update may replace an existing template view with a verify view to improve performance. An important criterion for replacement is the added coverage of the biometric feature, e.g., fingerprint. If the replacement view results in improved coverage, the FRR will improve. According to one embodiment, the coverage is estimated using virtual edges as illustrated in FIG. 12. As shown, the coverage is the union of views E1, E2 and E3. The connection between views E1 and E3 will be lost if the verify view replaces view E2 in the template during template update. To resolve this, in one embodiment, the connection information linking views E1 and E3 is maintained even after removing and replacing view E2 with the verify view. The connection information (transform T) may be referred to as a "virtual connection," or a "virtual edge."

To measure the coverage of the template, a mosaic of the biometric feature, e.g., finger, represented in the template is built. Building the mosaic requires finding the connections (alignments) among the template views. Each group of template views which are connected to each other (directly or through other views) is called a connected component. A mosaic for each connected component may be built in the template.

It is desirable to have all the views in the template connected to each other (and hence the template consists of a single connected component) in order to have a more reliable estimate of coverage. However, if the template update process removes a view that used to serve as a link between two views (e.g., view E2 in FIG. 12), the component from which that removed view belongs will split into two components (two components E1 and E3). To improve the template connectivity, in one embodiment, virtual connections are used. A virtual connection is an edge (e.g., a transform) that is based on a view which no longer exists in the template (e.g., because it was replaced during template update). According to an embodiment, when replacing a view in the template update process (see, e.g., step 670 of FIG. 6), the links induced by this (replaced) view are maintained in the template. For example, in FIG. 12, even though template update removed view E2, the link information T3 defining the link between view E1 and view E3 is maintained. The link information for a removed view may be maintained in the template storage with the template, or it may be stored elsewhere in the system. It should be appreciated that the virtual connection T3 linking E1 and E3 may be a previously computed composed transform based on a first transform T1 linking E1 and E2 and a second transform T2 linking E2 and E3.

Use of virtual edges advantageously helps maintain the connectivity of the views in the template, while improving the coverage of the template, and also improves the reliability of the template update process. Additionally, the number of connected components in the template is maintained or reduced, and an improvement in FRR may be achieved.

Improving Initial FRR of Matcher with Template Update

As discussed above, template updating allows for a fewer number of enrollment views to be captured and stored initially during an enrollment process or stage, thereby saving time for a user to provide security for the system using the biometric template for access security. However, with fewer views in the template, the initial false rejection rate (FRR) may be too high in some instances. Further, not only is the FRR likely higher when the number of enrollment views is lower, but also the false acceptance rate (FAR) may be lower. This is because fewer views in the template will reduce the chances of a biometric view or image provided by an impostor to align and match with the template.

In one embodiment, when there are fewer than an allowable number of views in the template, the threshold value (verification threshold) used to verify a new verify view may be reduced. Additionally, or alternatively, the threshold value (match threshold or update threshold) used to determine whether to add a view to the template may be reduced. The match threshold may be the same as or different from the verification threshold, and the match criteria used to determine the matching score that is thresholded for template updating can be the same as or different from the match criteria used to determine the matching score that is thresholded for verification of a view.

In one embodiment, a variable or adaptive verification threshold, which depends on the number of views in the template, is used. For example, the verification threshold value is initially reduced in response to the enrollment template containing fewer than the allowable number of enrollment views storable in the template. The verification threshold value may increase as the number of views in the template increases. In this manner, initially (when there are only a few views in the template), the matching criterion may be more lenient, and gradually increase in stringency until the regular threshold (e.g., the regular verification threshold used for the maximum number of allowable template views) is reached. This will guarantee that FAR will remain low (for high security), while the initial FRR also remains acceptable.

The regular threshold requires a minimum overlap between the verify view and the template view in order to satisfy the security requirement (e.g., 1/50K FAR). However, when the number of views are much less (for example 4 views), FAR will automatically be lower. Therefore, by reducing the verification threshold initially, the minimum overlap required between the verify view and the template view is effectively reduced, which will reduce the initial FRR. In one embodiment, different thresholds (verification threshold and/or match threshold) will be used or set depending on the current number of template views in the template. The match threshold, in certain aspects, may correspond to the desired FAR (e.g., 1/50K) for each particular number of views in the template.

It should be understood that either or both of the verification threshold value and the match threshold value may be adjusted in response to a determination that the enrollment template contains fewer views than the allowable number of views storable in the template. Hence, in another embodiment, at least one of the match threshold value and the verification threshold value is reduced in response to determining that the enrollment template contains fewer than an allowable number of enrollment views storable in the enrollment template.

For example, in one embodiment, a method of verifying a new input biometric view includes comparing a new input biometric view to an enrollment template having a plurality of enrollment views, computing a matching score based on the comparing, determining whether the matching score satisfies a threshold, and indicating a biometric match in response to determining that the matching score satisfies the threshold, wherein the threshold is correlated to a number of the plurality of enrollment views in the enrollment template. The threshold may increase in stringency as a function of the number of views in the template; the function may be a linear function or a non-linear function. For example, as the number of views in the template increases, the threshold value that is compared with the matching score increases linearly or non-linearly with the number of stored template views (e.g., becomes more stringent as the number of template views increases).

Figure 13:
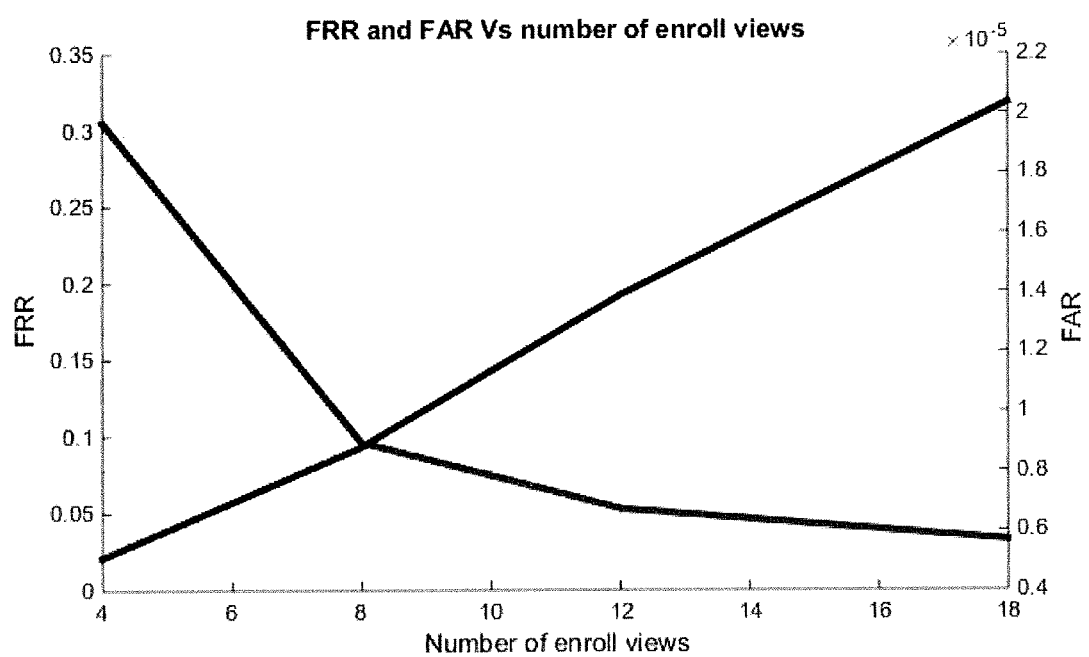
FIG. 13 shows FRR and FAR v. the number of template views.
Figure 14:
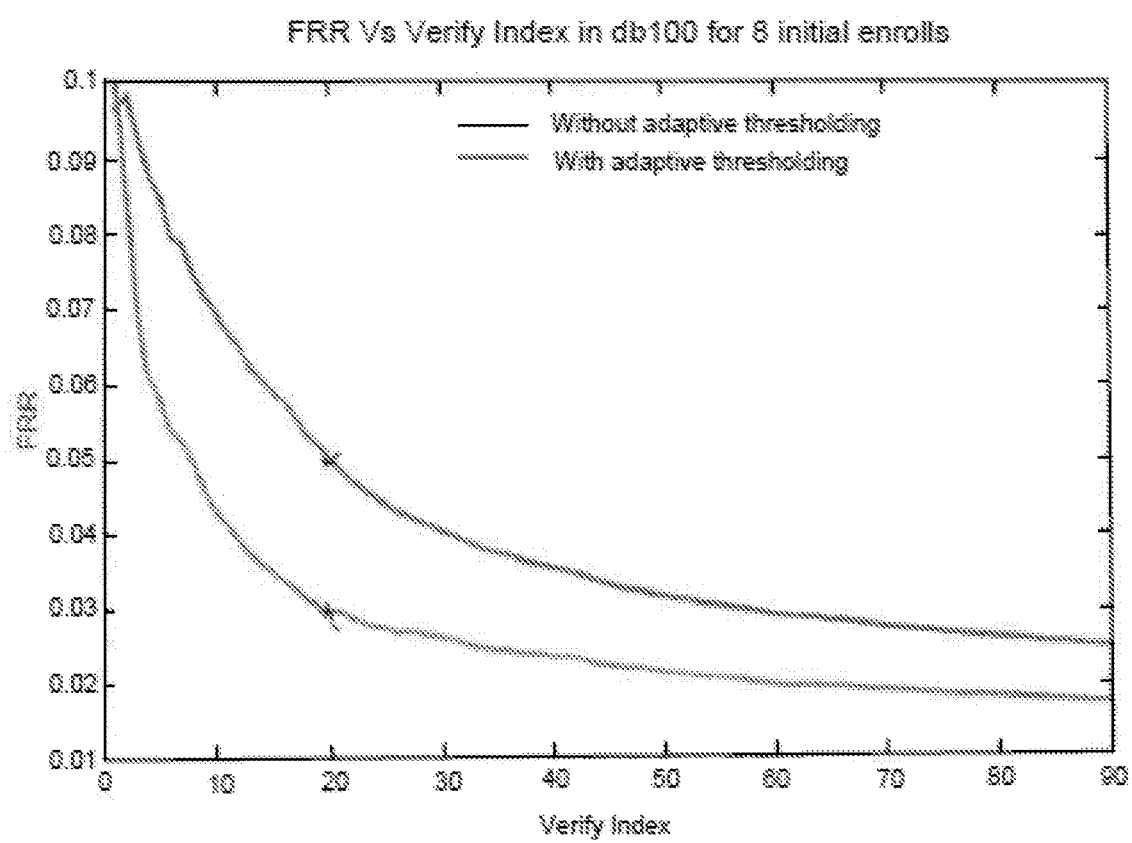
FIG. 14 shows the FRR improvement as the user provides additional verification views and the template is updated when the template update threshold is chosen adaptively compared to a single fixed number, according to an embodiment.

FIG. 13 shows the FRR and FAR v. the number of template views. As shown in FIG. 13, when the number of template views is 4, FAR is ~¼th of the FAR when the number of views is 18, which indicates that the threshold may advantageously be relaxed to improve the initial FRR, and the threshold may be gradually increased until the template is full (18 views). FIG. 14 shows the FRR improvement as the user provides additional verification views and the template is updated. The difference in FRR between using a regular, constant threshold (top curve) and using a threshold value that is adapted or modified based on the number of template views (bottom curve) shows that the FRR may be advantageously reduced using adaptive or variable threshold values. As can be seen in the example of FIG. 14, after 20 verify touches or view, the FRR is reduced to about 3% using adaptive thresholding, whereas the FRR is only reduced to about 5% when adaptive thresholding is not used (i.e., constant threshold value used).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Certain embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method of updating an enrollment template having a plurality of enrollment views of a biometric input object, the method comprising:
   determining whether a new input biometric view is a candidate view for template update based on a match criteria;
   determining whether the new input biometric view increases coverage of the biometric input object by the enrollment template, by:
      computing a sum-mosaic view of the plurality of enrollment views in the enrollment template, wherein each pixel in the sum-mosaic view has a value representing a number of the enrollment views overlapping at that pixel position; and
      for a respective enrollment view of the plurality of enrollment views, removing the respective enrollment view from the sum-mosaic view and computing a number of sum-mosaic pixels having a non-zero value; and
   adding the new input biometric view to the enrollment template as a new enrollment view in response to determining that the new biometric view i) is a candidate view for template update, and ii) increases coverage of the biometric input object by the enrollment template.

2. The method of claim 1, wherein the adding comprises replacing a first enrollment view of the plurality of enrollment views with the new input biometric view in response to determining that the first enrollment view is a most redundant view in the enrollment template.

3. The method of claim 1, further comprising determining a most redundant view as the enrollment view which when removed from the sum-mosaic view corresponds to a largest number of sum-mosaic pixels having a non-zero value remaining, and wherein the adding comprises replacing the most redundant view with the new input biometric view.

4. The method of claim 1, wherein the determining whether the new biometric view increases coverage includes determining that the new biometric view increases coverage of the biometric input object in response to determining that the enrollment template contains fewer than an allowable number of enrollment views storable in the enrollment template.

5. The method of claim 1, wherein the determining whether the new biometric view increases coverage includes:
 computing a mosaic view of the plurality of enrollment views in the enrollment template, wherein a number of non-zero pixels in the mosaic view represents the coverage of the plurality of enrollment views in the enrollment template; and
 adding the new input biometric view to the mosaic view and determining an amount of increase in the number of non-zero pixels in the mosaic view.

6. The method of claim 1, wherein at least one of a match threshold value and a verification threshold value is reduced in response to determining that the enrollment template contains fewer than an allowable number of enrollment views storable in the enrollment template.

7. The method of claim 1, wherein a verification threshold value increases in stringency as a function of a number of enrollment views in the enrollment template.

8. The method of claim 1, wherein the adding comprises replacing a first enrollment view of the plurality of enrollment views with the new input biometric view, the method further comprising storing virtual connection information corresponding to the first enrollment view after replacing the first enrollment view.

9. The method of claim 8, wherein the virtual connection information includes a composed transformation between the new input biometric view and a second enrollment view of the plurality of enrollment views, wherein the composed transformation is based on a first transformation between the new input biometric view and the first enrollment view and a second transformation between the first enrollment view and the second enrollment view.

10. The method of claim 1, further comprising comparing the new input biometric view to the enrollment template and authenticating the new biometric input view based on the comparison.

11. The method of claim 1, wherein the biometric input object includes a finger, and each enrollment view corresponds to a portion of a fingerprint of the finger.

12. An electronic device for biometric recognition of a biometric input object, the electronic device comprising:
 a biometric sensor configured to sense a biometric input object proximal to an input surface of the biometric sensor;
 a memory for storing a biometric enrollment template including a plurality of enrollment views of the biometric input object; and
 a processing system comprising a processor, the processing system coupled to the memory and to the biometric sensor and configured to:
  receive a new input biometric view from the biometric sensor;
  determine whether the new input biometric view is a candidate view for updating the biometric enrollment template based on a match criteria;
  determine whether the new input biometric view increases coverage of the biometric input object by the biometric enrollment template by:
   computing a sum-mosaic view of the plurality of enrollment views in the enrollment template, wherein each pixel in the sum-mosaic view has a value representing a number of the enrollment views overlapping at that pixel position; and
   for a respective enrollment view of the plurality of enrollment views, removing the respective enrollment view from the sum-mosaic view and computing a number of sum-mosaic pixels having a non-zero value; and
  add the new biometric view to the biometric enrollment template as a new enrollment view in response to determining that the new biometric view i) is a candidate view for updating the biometric enrollment template, and ii) increases coverage of the biometric input object by the biometric enrollment template.

13. The electronic device of claim 12, wherein the processing system adds the new biometric view to the biometric enrollment template by replacing a first enrollment view of the plurality of enrollment views with the new input biometric view in response to determining that the first enrollment view is a most redundant view in the biometric enrollment template.

14. The electronic device of claim 12, wherein at least one of a match threshold value and a verification threshold value is reduced in response to the processing system determining that the enrollment template contains fewer than an allowable number of enrollment views storable in the biometric enrollment template.

15. The electronic device of claim 12, wherein the processing system adds the new input biometric view by replacing a first enrollment view of the plurality of enrollment views with the new input biometric view, and wherein the processing system is further configured to store virtual connection information corresponding to the first enrollment view after replacing the first enrollment view, wherein the virtual connection information includes a composed transformation between the new input biometric view and a second enrollment view of the plurality of enrollment views, wherein the composed transformation is based on a first transformation between the new input biometric view and the first enrollment view and a second transformation between the first enrollment view and the second enrollment view.

16. The electronic device of claim 12, wherein the processing system is further configured to determine a most redundant view as the enrollment view which when removed from the sum-mosaic view corresponds to a largest number of sum-mosaic pixels having a non-zero value remaining, and wherein the processing system adds the new input biometric view by replacing the most redundant view with the new input biometric view.

17. A non-transitory computer readable medium storing instructions for updating a biometric enrollment template stored in a memory coupled to a processing system, the biometric enrollment template having a plurality of enrollment views of an input biometric object, wherein the instructions, when executed by the processing system, cause the processing system to:
 receive a new input biometric view from a biometric sensor coupled with the processing system;
 determine whether the new input biometric view is a candidate view for updating the biometric enrollment template based on a match criteria;

determine whether the new input biometric view increases coverage of the biometric input object by the biometric enrollment template, by:

computing a sum-mosaic view of the plurality of enrollment views in the enrollment template, wherein each pixel in the sum-mosaic view has a value representing a number of the enrollment views overlapping at that pixel position; and for a respective enrollment view of the plurality of enrollment views, removing the respective enrollment view from the sum-mosaic view and computing a number of sum-mosaic pixels having a non-zero value; and add the new biometric view to the biometric enrollment template as a new enrollment view in response to determining that the new biometric view i) is a candidate view for updating the biometric enrollment template, and ii) increases coverage of the biometric input object by the biometric enrollment template.

18. The non-transitory computer readable medium of claim 17, wherein the instructions to add the new biometric view to the biometric enrollment template include instructions to replace a first enrollment view of the plurality of enrollment views with the new input biometric view in response to determining that the first enrollment view is a most redundant view in the biometric enrollment template.

19. The non-transitory computer readable medium of claim 17, further comprising instructions to determine a most redundant view as the enrollment view which when removed from the sum-mosaic view corresponds to a largest number of sum-mosaic pixels having a non-zero value remaining, and wherein the instructions to add comprise instructions to replace the most redundant view with the new input biometric view.

\* \* \* \* \*